UNITED STATES PATENT OFFICE.

MYRTIL KAHN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

BROWN DYE.

946,050.   Specification of Letters Patent.   Patented Jan. 11, 1910.

No Drawing.   Application filed May 18, 1909.   Serial No. 496,844.

*To all whom it may concern:*

Be it known that I, MYRTIL KAHN, doctor of philosophy, chemist, citizen of the German Empire, residing at Elberfeld, Germany, have invented new and useful Improvements in Brown Dye, of which the following is a specification.

My invention relates to the manufacture and production of new brown disazo dyestuffs which can be obtained by combining the tetrazo compounds of meta-diaminodiphenylurea with one molecule of a meta-phenylenediamin sulfonic acid and with one molecule of any other azo dyestuff component. The dyes thus obtained are in the shape of their alkaline salts brown powders soluble in water with a brown color; upon reduction with stannous chlorid and hydrochloric acid they are decomposed, carbonic acid, meta-phenylenediamin, triaminobenzene sulfonic acid and an amin being obtained. They are valuable brown substantive dyestuffs, which possess an extraordinary affinity for cotton. They can be developed after dyeing with diazotized para-nitranilin. In this way very full brown and especially yellowish-brown shades are obtained, which can be discharged a splendid white with discharging agents. The fastness to washing of these shades is very good.

In order to illustrate the new process more fully the following example is given, the parts being by weight: 24.2 parts of meta-diaminodiphenylurea are dissolved in 1200 parts of water and 100 parts of a 30 per cent. hydrochloric acid. It is then diazotized in the usual manner with a solution of 14 parts of sodium nitrite in 500 parts of water. A solution of 18.8 parts of meta-phenylenediamin sulfonic acid ($NH_2:NH_2:SO_3H=1:3:4$) in 500 parts of water is added which solution contains an excess of sodium carbonate. The intermediate compound separates out. Its formation is complete after a short time. Subsequently an aqueous solution of 11 parts of meta-phenylenediamin is added to the mass of the reaction which is then stirred for about 10–12 hours. The dye is filtered off and dried. It is after being dried and pulverized in the shape of its sodium salt a brown powder soluble in hot water with a yellowish-brown color and soluble in concentrated sulfuric acid with a brownish-red color; upon reduction with stannous chlorid and hydrochloric acid the dye is split up into carbonic acid, meta-phenylenediamin, triaminobenzene and triaminobenzene sulfonic acid. It dyes cotton brown shades which after combination with diazotized paranitranilin of the fiber change into yellowish-brown shades fast to washing and leaving after being discharged a pure white.

The process is carried out in an analogous manner on using other of the above mentioned components, *e. g.* meta-phenylenediamin disulfonic acid ($NH_2:NH_2:SO_3H:SO_3H=1:3:4:6$), meta-aminophenol, chloro-meta-phenylenediamin ($NH_2:NH_2:Cl—1:3:4$), resorcin, meta-toluylenediamin.

I claim:

1. The herein described new disazo dyestuffs obtainable from meta-diaminodiphenylurea, meta-phenylenediamin sulfonic acid and a suitable azo dyestuff component, which dyestuffs are, after being dried and pulverized, in the shape of their alkaline salts brown powders soluble in hot water with a brown color; yielding upon reduction with stannous chlorid and hydrochloric acid carbonic acid, meta-phenylenediamin, triaminobenzene sulfonic acid and an amin; and dyeing cotton brown shades, which after being developed on the fiber with diazotized para-nitranilin are fast to washing leaving after being discharged a pure white, substantially as described.

2. The herein described new disazo dyestuff obtainable from meta-diaminodiphenylurea, meta-phenylenediamin sulfonic acid and meta-phenylenediamin, which dyestuff is, after being dried and pulverized, in the shape of its sodium salt a brown powder soluble in hot water with a yellowish-brown color and soluble in concentrated sulfuric acid with a brownish-red color, yielding upon reduction with stannous chlorid and hydrochloric acid carbonic acid, meta-phenylenediamin, triaminobenzene and triaminobenzene sulfonic acid; and dyeing cotton brown shades, which after being developed on the fiber with diazotized para-nitranilin change into yellowish-brown shades fast to washing and leaving after being discharged a pure white, substantially as described.

In testimony whereof I have hereunto set my hand in the presence of two subscribing witnesses.

MYRTIL KAHN. [L. S.]

Witnesses:
 OTTO KÖNIG,
 C. J. WRIGHT.